(12) United States Patent
Nanninga

(10) Patent No.: US 10,646,914 B2
(45) Date of Patent: May 12, 2020

(54) ALUMINUM ALLOYS FOR APPLICATIONS SUCH AS WHEELS AND METHODS OF MANUFACTURE

(71) Applicant: ACCURIDE CORPORATION, Evansville, IN (US)

(72) Inventor: Nicholas E. Nanninga, Evansville, IN (US)

(73) Assignee: ACCURIDE CORPORATION, Evansville, IN (US)

(*) Notice: Subject to any disclaimer, the term of this patent is extended or adjusted under 35 U.S.C. 154(b) by 0 days.

(21) Appl. No.: 16/219,536

(22) Filed: Dec. 13, 2018

(65) Prior Publication Data

US 2019/0218647 A1 Jul. 18, 2019

Related U.S. Application Data

(60) Provisional application No. 62/617,018, filed on Jan. 12, 2018.

(51) Int. Cl.
*B21K 1/38* (2006.01)
*C22C 21/08* (2006.01)
(Continued)

(52) U.S. Cl.
CPC ............... *B21K 1/38* (2013.01); *B21J 9/025* (2013.01); *B21K 1/32* (2013.01); *B60B 3/002* (2013.01); *C22C 21/02* (2013.01); *C22C 21/08* (2013.01); *C22F 1/05* (2013.01); *B21J 5/025* (2013.01); *B60B 2310/208* (2013.01); *B60B 2360/104* (2013.01); *C22C 2202/00* (2013.01)

(58) Field of Classification Search
CPC ............. C22C 21/08; B21K 1/32; B21J 5/025
See application file for complete search history.

(56) References Cited

U.S. PATENT DOCUMENTS 3,113,052 A 12/1963 Schneck
3,149,001 A 9/1964 Wallace
(Continued)

FOREIGN PATENT DOCUMENTS

CN 101649406 A 2/2010
CN 101792877 A 8/2010
(Continued)

OTHER PUBLICATIONS

International Search Report with Written Opinion for related Application No. PCT/US18/65526 dated Mar. 4, 2019 (12 pages).
(Continued)

*Primary Examiner* — George Wyszomierski
*Assistant Examiner* — Janelle Morillo
(74) *Attorney, Agent, or Firm* — Michael Best & Friedrich LLP

(57) ABSTRACT

Aluminum alloys described herein include silicon, iron, copper, manganese, magnesium, and chromium. In various implementations, the aluminum alloys also include one or more of zinc and titanium. Typically, a total amount of iron and manganese in the aluminum alloys is no less than 0.28% by weight and no greater than 0.45% by weight, and the grains in the aluminum alloys have an average grain length of no greater than 6 mm. Aluminum alloy billets can be forged for wheel production at selected temperatures.

9 Claims, 17 Drawing Sheets

(51) Int. Cl.
  *B21J 5/02* (2006.01)
  *B21J 9/02* (2006.01)
  *C22C 21/02* (2006.01)
  *B60B 3/00* (2006.01)
  *B21K 1/32* (2006.01)
  *C22F 1/05* (2006.01)

(56) References Cited

U.S. PATENT DOCUMENTS

| | | | |
|---|---|---|---|
| 4,082,578 A | 4/1978 | Evancho et al. | |
| 5,027,508 A | 7/1991 | Cissell, II | |
| 5,240,519 A | 8/1993 | Kamio et al. | |
| 5,503,690 A | 4/1996 | Wade et al. | |
| 5,522,950 A | 6/1996 | Bartges et al. | |
| 5,571,347 A | 11/1996 | Bergsma | |
| 5,620,652 A | 4/1997 | Tack et al. | |
| 5,961,752 A | 10/1999 | Bergsma | |
| 6,248,189 B1 | 6/2001 | Shaffer et al. | |
| 6,361,741 B1 | 3/2002 | Klemp et al. | |
| 6,630,037 B1 * | 10/2003 | Sawada | C22F 1/05 148/417 |
| 7,163,594 B1 | 1/2007 | Tandon et al. | |
| 7,314,255 B2 | 1/2008 | Wang | |
| 9,970,090 B2 | 5/2018 | Parson et al. | |
| 2002/0031682 A1 | 3/2002 | Dif et al. | |
| 2002/0039664 A1 | 4/2002 | Magnusen et al. | |
| 2004/0035505 A1 | 2/2004 | Unal et al. | |
| 2004/0139610 A1 | 7/2004 | Suzuki et al. | |
| 2005/0086784 A1 | 4/2005 | Li et al. | |
| 2005/0095167 A1 | 5/2005 | Barth et al. | |
| 2007/0144630 A1 | 6/2007 | Anami et al. | |
| 2008/0145266 A1 | 6/2008 | Chen et al. | |
| 2010/0047114 A1 | 2/2010 | Shibata et al. | |
| 2012/0241055 A1 | 9/2012 | Okamoto | |
| 2012/0325381 A1 | 12/2012 | Gasqueres et al. | |
| 2014/0017116 A1 | 1/2014 | Lin et al. | |
| 2014/0096878 A1 | 4/2014 | Hatta et al. | |
| 2014/0096879 A1 | 4/2014 | Kim | |
| 2014/0166165 A1 | 6/2014 | Shibata | |
| 2014/0261909 A1 | 9/2014 | Shih et al. | |
| 2014/0366997 A1 | 12/2014 | Kamat et al. | |
| 2015/0007909 A1 | 1/2015 | Matsumoto et al. | |
| 2015/0013857 A1 | 1/2015 | Uggowitzer et al. | |
| 2016/0115575 A1 | 4/2016 | Bull et al. | |

FOREIGN PATENT DOCUMENTS

| | | |
|---|---|---|
| CN | 102477507 A | 5/2012 |
| CN | 103695737 A | 4/2014 |
| CN | 103695738 A | 4/2014 |
| CN | 103774000 A | 5/2014 |
| DE | 2817261 A1 | 11/1978 |
| EP | 0584028 A1 | 2/1994 |
| GB | 840469 A | 7/1960 |
| GB | 1037750 A | 8/1966 |
| JP | S5292812 A | 8/1977 |
| JP | S58167757 A | 10/1983 |
| JP | S59215453 A | 12/1984 |
| JP | H03006348 A | 1/1991 |
| JP | H06211336 A | 8/1994 |
| JP | H06256880 A | 9/1994 |
| JP | H07150312 A | 6/1995 |
| JP | H07188824 A | 7/1995 |
| JP | H07252570 A | 10/1995 |
| JP | H07252616 A | 10/1995 |
| JP | H0913137 A | 1/1997 |
| JP | H09249951 A | 9/1997 |
| JP | H09249952 A | 9/1997 |
| JP | H108172 A | 1/1998 |
| JP | H108173 A | 1/1998 |
| JP | H108174 A | 1/1998 |
| JP | H10317113 A | 12/1998 |
| JP | H10317115 A | 12/1998 |
| JP | H11047936 A | 2/1999 |
| JP | H11323472 A | 11/1999 |
| JP | H11350058 A | 12/1999 |
| JP | 2000212708 A | 8/2000 |
| JP | 2000282162 A | 10/2000 |
| JP | 2001059124 A | 3/2001 |
| JP | 2001335871 A | 12/2001 |
| JP | 2002294383 A | 10/2002 |
| JP | 2002317255 A | 10/2002 |
| JP | 2002348630 A | 12/2002 |
| JP | 2002348630 A * | 12/2002 |
| JP | 2002371332 A | 12/2002 |
| JP | 2003105473 A | 4/2003 |
| JP | 2003181530 A | 7/2003 |
| JP | 2004292847 A | 10/2004 |
| JP | 2006206984 A | 8/2006 |
| JP | 2010174337 A | 8/2010 |
| KR | 20130000341 A | 1/2013 |
| WO | WO09059826 A1 | 5/2009 |
| WO | WO15077880 A1 | 6/2015 |

OTHER PUBLICATIONS

Notice of Invitation to Pay Additional Fees from the International Searching Authority for related Application No. PCT/US18/65511 dated Feb. 26, 2019 (2 pages).

International Search Report with Written Opinion for Application No. PCT/US18/65511 dated May 7, 2019 (15 pages).

* cited by examiner

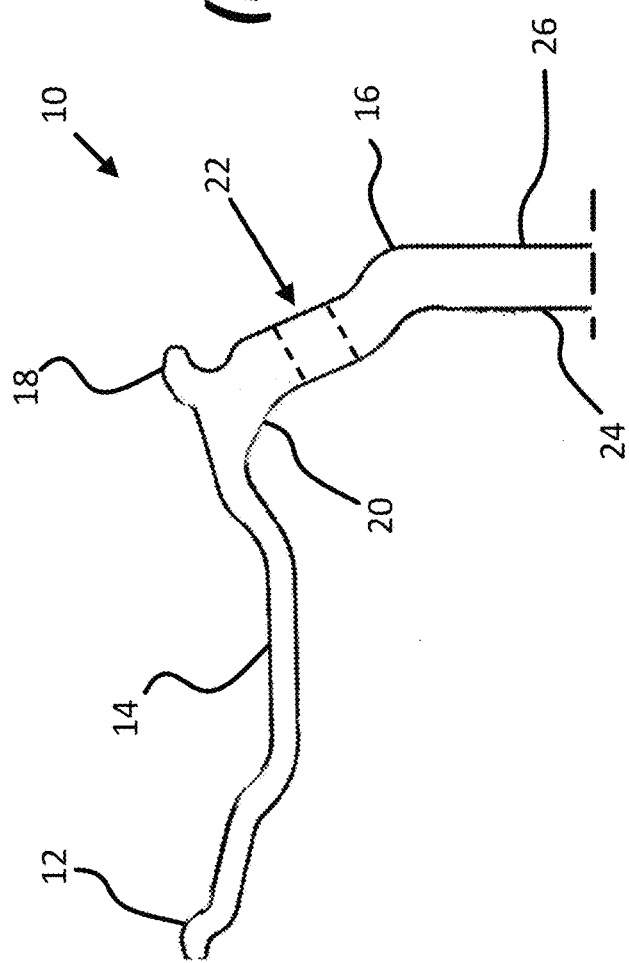
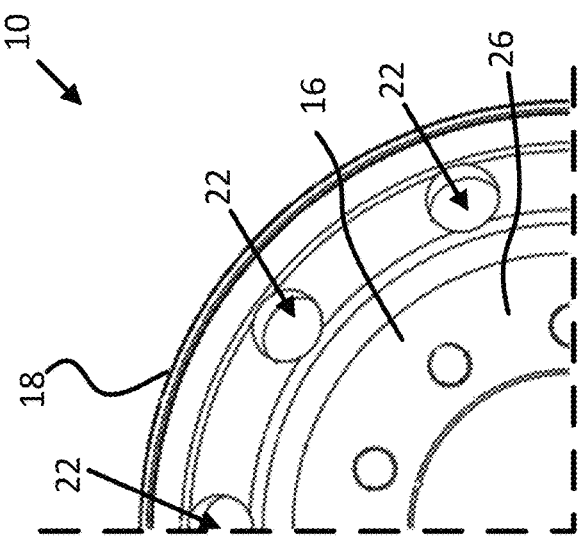
FIG. 1A (Prior Art)
FIG. 1B (Prior Art)

ALUMINUM ALLOYS FOR APPLICATIONS SUCH AS WHEELS AND METHODS OF MANUFACTURE

CROSS-REFERENCE TO RELATED APPLICATIONS

The present application claims priority to U.S. provisional patent application No. 62/617,018, filed Jan. 12, 2018, the disclosure of which is hereby incorporated by reference in its entirety.

FIELD OF DISCLOSURE

The present disclosure relates to materials, methods, and techniques of manufacture for aluminum alloys. Example applications relate to the preparation and manufacture of aluminum wheels.

INTRODUCTION

Aluminum wheels can experience fatigue and develop cracks in one or more locations. FIG. 1A is a partial side, cross-sectional view of example wheel 10. FIG. 1B is a partial front plan view of example wheel 10. Wheel 10 includes rim 12 and disc 16, connected near transition radius 20. Rim 12 includes rim drop center 14 and closed side flange 18. Disc 16 defines a plurality of hand holes 22. At a mounting portion, disc 16 defines concave disc face 24 and convex disc face 26. Typically, wheel cracks from fatigue can occur in a rim drop center, near the closed side flange, near the transition radius, at the concave disc face, at the convex disc face, and adjacent to a hand hole.

SUMMARY

Vehicle wheels are made of various materials, such as aluminum alloys and steel. Safety and performance considerations for vehicle wheels include a given wheel's ability to resist fatigue for extended periods of time. It is particularly challenging to achieve those goals with aluminum wheels, which are designed to be lighter than steel wheels.

Materials, methods and techniques disclosed and contemplated herein relate to aluminum alloys. Aluminum wheels manufactured with aluminum alloys disclosed herein, and in accordance with methods and techniques disclosed here, exhibit improved performance compared to existing aluminum wheels.

In one aspect, an aluminum alloy is disclosed. The aluminum alloy includes, by weight: 0.80% to 1.20% silicon; 0.08% to 0.37% iron; 0.35% to 0.55% copper; 0.07% to 0.37% manganese; 0.70% to 1.20% magnesium; 0.05% to 0.11% chromium; no more than 0.20% zinc; and no more than 0.05% titanium, and the balance of weight percent comprising aluminum and incidental elements and impurities.

In another aspect, an aluminum wheel having a rim and a disc is disclosed. The aluminum wheel is formed of an aluminum alloy comprising, by weight: 0.80% to 1.20% silicon; 0.08% to 0.37% iron; 0.35% to 0.55% copper; 0.07% to 0.37% manganese; 0.70% to 1.20% magnesium; 0.05% to 0.11% chromium; no more than 0.20% zinc; and no more than 0.05% titanium, and the balance of weight percent comprising aluminum and incidental elements and impurities.

In another aspect, a method for making an aluminum alloy is disclosed. The method includes receiving an aluminum alloy billet and forging the aluminum alloy billet at a temperature no less than 275° C. and no greater than 460° C. The aluminum alloy billet includes, by weight: 0.80% to 1.20% silicon; 0.08% to 0.37% iron; 0.35% to 0.55% copper; 0.07% to 0.37% manganese; 0.70% to 1.20% magnesium; 0.05% to 0.11% chromium; no more than 0.20% zinc; and no more than 0.05% titanium, and the balance of weight percent comprising aluminum and incidental elements and impurities.

Other aspects of the disclosure will become apparent by consideration of the detailed description and accompanying drawings. There is no specific requirement that a material, technique or method include all of the details characterized herein, in order to obtain some benefit according to the present disclosure. Thus, the specific examples characterized are meant to be exemplary applications of the techniques described, and alternatives are possible.

BRIEF DESCRIPTION OF THE DRAWINGS

FIG. 1A is a partial side, cross-sectional view of a prior art aluminum wheel. FIG. 1B is a partial front plan view of the wheel shown in FIG. 1A.

DETAILED DESCRIPTION

Figure 2:
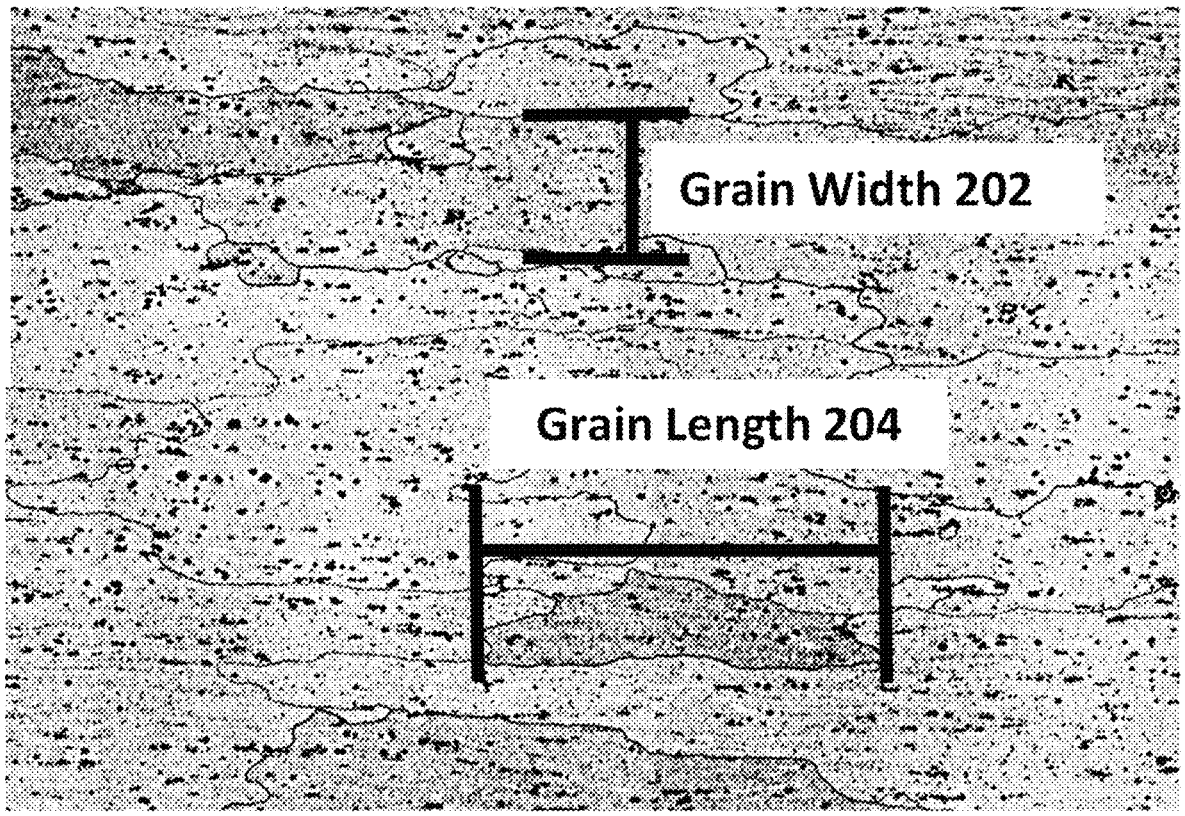
FIG. 2 is an example determination of grain width and grain length in a micrograph.

Aluminum alloys described and contemplated herein are particularly well suited for use in aluminum wheel manufacture. For instance, aluminum wheels manufactured using the materials, techniques and methods described and contemplated herein have improved fatigue performance. Broadly characterized, advantageous properties in aluminum wheels disclosed herein can be attributed to grain structures resulting from selection and performance of components and techniques disclosed herein.

In the following sections, example aluminum alloys are described, including various characteristics of the example aluminum alloys. Example methods of making aluminum wheels are also described. Last, a description is provided of experimental test results relating to example aluminum alloys and wheels manufactured with the example aluminum alloys.

I. Example Aluminum Alloys

Aluminum alloys described and contemplated herein can be characterized, for instance, by components, grain structure, or dispersoids. In some embodiments, a total amount of iron and manganese in the aluminum alloys is no less than 0.28% by weight and no greater than 0.45% by weight. In some embodiments, grains in the aluminum alloys have an average grain length of no greater than 6 mm.

A. Example Components and Amounts

Aluminum alloy compositions disclosed and contemplated herein include various components at various weight percentages, in addition to aluminum. Example components capable of inclusion in aluminum alloys disclosed and contemplated herein include: silicon (Si), iron (Fe), copper (Cu), manganese (Mn), magnesium (Mg), chromium (Cr), zinc (Zn), and/or titanium (Ti). Without being bound by a particularly theory, it is believed that both Si and Cu increase strength and fatigue resistance of the aluminum alloy.

In various implementations, aluminum alloys disclosed and contemplated herein include, by weight, 0.80% to 1.20% silicon; 0.08% to 0.37% iron; 0.35% to 0.55% copper; 0.07% to 0.37% manganese; 0.70% to 1.20% magnesium; 0.05% to 0.11% chromium; and the balance of weight percent comprising aluminum and, in certain instances, incidental elements and impurities. In various embodiments, aluminum alloys can further comprise no more than 0.20% zinc or no more than 0.05% titanium.

In other implementations, aluminum alloys disclosed and contemplated herein include, by weight, 0.90% to 1.00% silicon; 0.08% to 0.37% iron; 0.40% to 0.50% copper; 0.07% to 0.37% manganese; 1.00% to 1.10% magnesium; 0.05% to 0.11% chromium; and the balance of weight percent comprising aluminum and, in certain instances, incidental elements and impurities. In various embodiments, aluminum alloys can further comprise no more than 0.20% zinc or no more than 0.05% titanium.

Aluminum alloys disclosed and contemplated herein can also be characterized by the total amount of iron and manganese (i.e., the sum of the weight percent of iron and the weight percent of manganese). In various embodiments, the total amount of iron and manganese is no less than 0.28% by weight. In other embodiments, the total amount of iron and manganese is no greater than 0.45% by weight. In yet other embodiments, the total amount of iron and manganese is no less than 0.28% by weight and no greater than 0.45% by weight. In still other embodiments, the total amount of iron and manganese is no less than 0.30% by weight and no greater than 0.37% by weight.

Incidental elements and impurities in the disclosed alloys may include, but are not limited to, nickel, vanadium, zirconium, or mixtures thereof, and may be present in the alloys disclosed herein in amounts totaling no more than 1%, no more than 0.9%, no more than 0.8%, no more than 0.7%, no more than 0.6%, no more than 0.5%, no more than 0.4%, no more than 0.3%, no more than 0.2%, no more than 0.1%, no more than 0.05%, no more than 0.01%, or no more than 0.001%.

The alloys described herein may consist only of the above-mentioned constituents, may consist essentially of such constituents, or, in other embodiments, may include additional constituents.

B. Grain Structure

Aluminum alloy compositions disclosed and contemplated herein can also be characterized by grain structure. As used herein, a "grain" is a pancake-shaped distinct crystal in the aluminum alloy, usually having an aspect ratio of length to width of from 5 to 25. Grain size analysis can be discussed in terms of grain length and grain width, where both grain length and grain width measurements are average values of the grains. An example identification of grain width 202 and grain length 204 is shown in FIG. 2. For this disclosure, grain size is typically measured on the scale of millimeters.

Generally speaking, during forming and heat treating processes, grain size changes. Grain size changes relate to the types of forming processes used and the quantity of dispersoids. Dispersoids are part of the chemical composition and are formed from those certain elements (e.g., Fe, Mn, Cr) in the alloys. Dispersoid density can control the resulting grain structure and grain size.

Grain size can be determined using the following method. First, a sample is metallographically polished with final colloidal silica (0.04 µm) polish. In some instances, the sample is obtained from a disc slope portion of an aluminum wheel. Then a swab etch with Keller's reagent (2 ml HF, 3 ml HCL, 5 ml $HNO_3$, 190 ml $H_2O$) is performed for approximately 1 minute. Then optical microscopy and grain size measurements can be performed by ASTM E112 line method in the horizontal (length) and vertical (width) directions.

In implementations where aluminum alloys disclosed and contemplated herein are used in the manufacture of wheels, grain size impacts wheel fatigue performance. As shown below in experimental examples, wheel fatigue performance improves with alloys having average grain lengths no greater than 6.0 mm.

Finer grains are typically better for resisting the formation of fatigue cracks. Fine grains can be defined as unrecrystallized grains formed during casting, unrecrystallized grains with subgrains formed during hot forging, and/or dynamically recrystallized grains formed during hot forging.

Aluminum wheels formed from aluminum alloys disclosed and contemplated herein have less than 50% by area fraction of fine grains in the disc portion of the wheel. In various embodiments, aluminum wheels have less than 45%; less than 40%; less than 30%; less than 25%; or less than 20% by area fraction of fine grains in the disc portion of the wheel.

The instant disclosure shows that fretting-fatigue followed by fatigue crack growth is a common failure mode on the disc faces of wheels because of the vehicle mounting configuration. Medium recrystallized grains can demonstrably enhance the resistance of the wheel to fretting-fatigue and fatigue crack growth in these parts of the wheel. Furthermore, medium recrystallized grain structures provide good resistance to both fatigue crack initiation and fatigue crack growth in other parts of the wheel.

Aluminum alloys forged according to techniques and methods disclosed and contemplated herein have an average grain length no greater than 6.0 mm. In various embodiments, aluminum alloys disclosed and contemplated herein have an average grain length no greater than 4 mm. In other embodiments, aluminum alloys disclosed and contemplated herein have an average grain length of no less than 0.4 mm and no greater than 6 mm. As particular examples, aluminum alloys disclosed and contemplated herein have an average grain length no greater than 5.50 mm; no greater than 5.00 mm; no greater than 4.75 mm; no greater than 4.50 mm; no greater than 4.25 mm; no greater than 4.00 mm; no greater than 3.75 mm; no greater than 3.50 mm; no greater than 3.25 mm; no greater than 3.00 mm; no greater than 2.75 mm; no greater than 2.50 mm; no greater than 2.25 mm; no greater than 2.00 mm; no greater than 1.75 mm; no greater than 1.50 mm; no greater than 1.25 mm; no greater than 1.00 mm; no greater than 0.75 mm; no greater than 0.50 mm; or no greater than 0.40 mm.

Grain size can also be determined in terms of average grain width. Aluminum alloys disclosed and contemplated herein typically have a grain width no greater than 0.40 mm, even when an average grain length is greater than 4 mm and less than 6 mm. In some instances, grain width is no greater than 0.30 mm. In other instances, grain width is no less than 0.25 mm.

Grain size determination typically includes determining an average grain length and width of grains within one or more samples. The samples are two dimensional sections of a wheel. Grain size can be determined in each sample and, where multiple samples are used in the determination, the grain sizes may be averaged. As an example, multiple samples along the wheel profile are obtained and each sample may have a length of 25 mm and a width equal to the wheel thickness.

C. Dispersoids

Aluminum alloy compositions disclosed and contemplated herein can also be characterized by dispersoids. The term "dispersoids" is known in the art and, generally, refers to pieces of various alloy components. For instance, dispersoids can be iron, manganese, chromium, titanium, and/or silicon rich intermetallic compounds with various stoichiometry's (Al—Fe—Si, Al—Mn, Al—Cr, Al—Fe(Mn,Cr)—Si, Al—V, Al—Zr, Al—Ti).

Generally speaking, desired grain structures (e.g., grain size and distribution) are impacted by the number, size and distribution of dispersoids in the aluminum alloy. For common commercially available aluminum alloys, the number of dispersoids in the aluminum alloy can be related to an amount of iron, manganese, or chromium, as well as the homogenization temperature of the cast billet.

Homogenization methods can be adapted to attain one or more desired properties as disclosed and contemplated herein. As an example, homogenization can include slowly heating a billet to a temperature between 550° C. and 575° C. for between 2 hours and 8 hours, followed by fan cooling in air. In some instances, homogenization occurs at a temperature between 550° C. and 560° C. In some instances, homogenization heating occurs for about 4 hours.

In various implementations, dispersoids in the aluminum alloys disclosed and contemplated herein have a distribution of no greater than 0.20 per $\mu m^2$. In other implementations, dispersoids in the aluminum alloys disclosed and contemplated herein have a distribution of no greater than 0.10 per $\mu m^2$. In yet other implementations, dispersoids in the aluminum alloys disclosed and contemplated herein have a distribution of from 0.06 per $\mu m^2$ to 0.10 per $\mu m^2$. Distributions below 0.03 per $\mu m^2$ may result in excessive coarsening of the grain structure.

In various implementations, dispersoids have an average size of from 230 nm to 260 nm. In other implementations, dispersoids have an average size of from 230 nm to 250 nm. In yet other implementations, dispersoids have an average size of from 228 nm to 248 nm.

D. Forging

Billets of aluminum alloy compositions disclosed and contemplated herein can be forged on conventional closed die forging presses to produce various products. For example, aluminum alloy billets can be forged into a premachined disc portion of a wheel using a closed die forging press.

Aluminum alloy billet forging can occur at various temperatures, assuming atmospheric pressure conditions. Atmospheric pressure conditions mean a pressure of the external environment at the location at which the process of the present disclosure is operated. As examples, aluminum alloy billets can be forged at a temperature no less than 275° C. and no greater than 460° C. In other implementations, aluminum alloy billets are forged at a temperature no less than 350° C. and no greater than 400° C. In yet other implementations, aluminum alloy billets are forged at a temperature no less than 370° C. and no greater than 427° C. or 450° C. In yet other implementations, aluminum alloy billets are forged at a temperature of no less than 275° C. and no greater than 427° C. As specific examples, the cast aluminum alloy billet is forged at a temperature of 260° C., 270° C., 280° C., 290° C., 300° C., 310° C., 320° C., 330° C., 340° C., 350° C., 360° C., 370° C., 380° C., 390° C., 400° C., 410° C., 420° C., 427° C., 430° C., 440° C., 450° C., or 460° C.

Generally, higher forging temperatures provide better die life longevity. Alloys and wheels disclosed and contemplated herein can have grain structures disclosed above at higher forging temperatures. Accordingly, a related benefit of alloys and wheels disclosed herein may be improved die life longevity.

II. Example Methods of Making Aluminum Wheels

An example method for making an aluminum wheel includes first receiving a cast and homogenized aluminum alloy billet, where the aluminum alloy billet includes one or more properties and components described above. Then the cast aluminum alloy billet is heated to a temperature of from 260° C. to 460° C.

After heating the billet, a wheel profile is forged using a conventional closed die forging press with one continuous hit to the billet at a strain rate of from 0.0254 to 2.54 cm/cm/sec. During this operation, material within the forging press undergoes dynamic recrystallization.

Following forging of the wheel profile, a rim contour is flow formed at a temperature of from 21° C. to 316° C. Next, solution heat treatment is performed at a temperature of from 510° C. to 566° C. During solution heat treatment, material in the disc undergoes static recrystallization, grain growth, or both, to obtain desired grain sizing. In some instances, material in the disc is approximately 538° C. during the heat treatment.

Other forging processes are possible, such as multistep forging processes. For instance, the example method can include forging a pancake, then the bowl shape, and then forging the rim. As another example, the example method can include forging the pancake, then the bowl, and then spin forming the rim.

Then the forge is quenched. After quenching, the forging is aged at a temperature of from 148° C. to 233° C. Last, the wheel is machined from the central part of the forging.

III. Experimental Examples

Experimental examples of aluminum alloys disclosed above were made and tested. In some instances, the experimental examples were formed into wheels and compared with existing commercial wheels. In particular, experiments on the alloys and wheels included performance testing such as fatigue performance determinations, experimental manufacturing methods, and grain and dispersoid analysis.

A. Experimental Grain Size Development

Experiments were performed with example alloys to evaluate grain size for various aluminum wheels. In particular, one objective of the experiments was to optimize grain size for improved wheel fatigue performance while using forging temperatures that preferably were no greater than 427° C. Two different alloys were tested and each alloy was forged at temperatures of 371° C., 399° C., 427° C. and 454° C. The two alloys are listed below in Table 1.

TABLE 1

Example alloys tested on closed die traditional forging operation.

| Test Alloy | Si | Fe | Cu | Mn | Mg | Cr | Zn | Ti |
|---|---|---|---|---|---|---|---|---|
| 1 | 1.09 | 0.21 | 0.45 | 0.21 | 0.95 | 0.18 | 0.01 | 0.017 |
| 2 | 0.92 | 0.28 | 0.46 | 0.17 | 1.06 | 0.19 | 0.02 | 0.025 |

In the experiments, grain size analysis was performed on the disc slope only. The grain size is the average length of a grain. The experiments did not include collecting data on a fraction of recrystallized and unrecrystallized grains in the disc. Fatigue tests were also performed on each alloy, where fatigue life is an estimate based on Accuride Test Standard CE-006 (which follows SAE J267). The grain size analysis data for each test alloy is shown in Table 2, below.

TABLE 2

Experimental results for the test alloys in Table 1.

| Test Alloy | Forging Temperature (° C.) | Grain size (mm) | Estimated Fatigue Life (cycles) | Failure Mode |
|---|---|---|---|---|
| 1 | 454 | 25.4 | 516,667 | CC-HH-TR |
|   | 427 | 5.33 | 683,333 | CC-HH-TR |
|   | 371 | 2.03 | 933,333 | CC-HH-TR |
| 2 | 454 | 19.3 | 333,333 | CC-HH-TR |
|   | 427 | 4.83 | 633,333 | CC-HH-TR |
|   | 399 | 3.81 | 966,667 | CC-HH-TR |
|   | 371 | 1.27 | 1,100,000 | CC-HH-TR |

Failure was noted in Table 2 by the locations where they occurred, namely: CC = concave; HH = hand hole; TR = disc to rim transition under the bead seat.

As is shown in Table 2 above, generally, as forging temperature increases, so too does grain size. Additionally, as grain size decreases, estimated fatigue life improves.

Without being bound by a particular theory, it is believed that the transition in performance for both test alloys at higher temperatures is associated with a combination of grain coarsening and the stabilization of fine grains.

Figure 3:
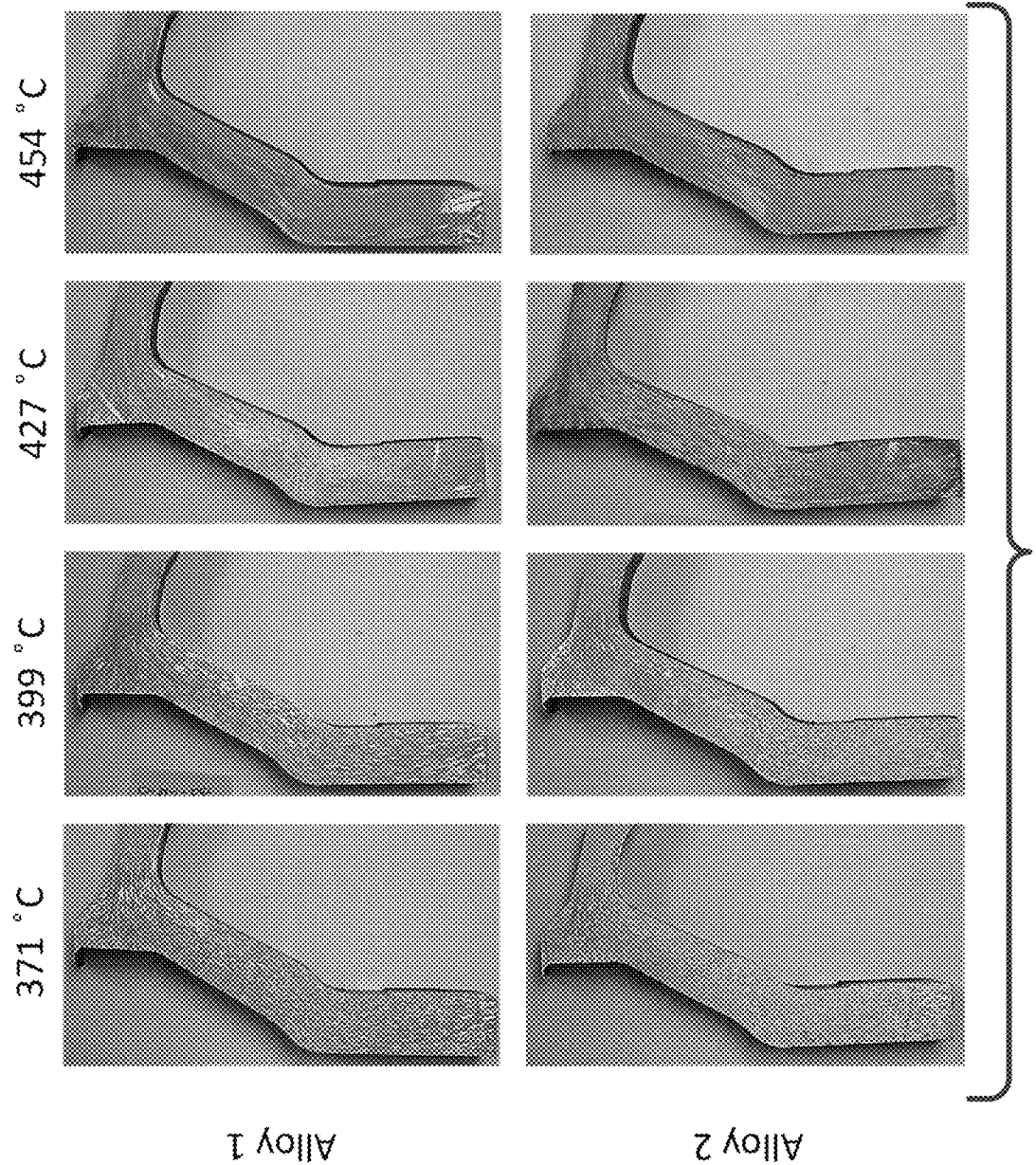
FIG. 3 shows photographs of experimental results from etching test alloys.

FIG. 3 shows photographs of experimental results from etching the two test alloys 1 and 2 at 371° C., 399° C., 427° C., and 454° C. Etching was performed by (1) uniform grinding with 120 grit SiC and (2) 5 minutes in solution of 300 mL $H_2O$, 75 g $FeCl_3$, 450 mL $HNO_3$, and 150 mL HCl at room temperature. As shown in FIG. 3's photographs of Alloy 1 and Alloy 2 at 454° C., there is grain coarsening and stabilization of fine grains. For alloys forged at temperatures less than 400° C., grains in the disc portion were less than 4.0 mm long and displayed medium recrystallized grain structure. Also, for Test Alloy 2, a desired grain structure of no greater than 4.0 mm grain length can be achieved when forging at a temperature of no greater than 399° C.

B. Experimental Performance Compared to Available Wheels

Experiments were performed on wheels with example alloys to compare alloys disclosed and contemplated herein with commercially available wheels. Specifically, five wheels were analyzed for grain structure and fatigue performance. Each wheel was an industry standard 22.5 inch× 8.25 inch (57.15 cm×20.955 cm) hub piloted wheel. Compositions and wheel weights for each of the five wheels are provided in Table 3, below.

TABLE 3

Compositions and wheel weights for tested wheels.

| Test Wheel | Standard | Weight (kg) | Composition (wt. %) | | | | | | | |
|---|---|---|---|---|---|---|---|---|---|---|
| | | | Si | Fe | Cu | Mn | Mg | Cr | Zn | Ti |
| A | AA6361 | 18.1 | 0.6-0.9 | 0.40 | 0.20-0.50 | 0.10-0.20 | 1.0-1.4 | 0.10-0.30 | 0.25 | 0.15 |
| B | AA6061 | 26.3 | 0.40-0.8 | 0.7 | 0.15-0.40 | 0.15 | 0.8-1.2 | 0.04-0.35 | 0.25 | 0.15 |
| C | AA6061 | 21.3 | 0.40-0.8 | 0.7 | 0.15-0.40 | 0.15 | 0.8-1.2 | 0.04-0.35 | 0.25 | 0.15 |
| D | AA6061 | 20.4 | 0.40-0.8 | 0.7 | 0.15-0.40 | 0.15 | 0.8-1.2 | 0.04-0.35 | 0.25 | 0.15 |
| E | AA6099 | 18.1 | 0.8-1.2 | 0.7 | 0.10-0.7 | 0.10-0.40 | 0.7-1.2 | 0.04-0.35 | 0.25 | 0.10 |

Figure 4:
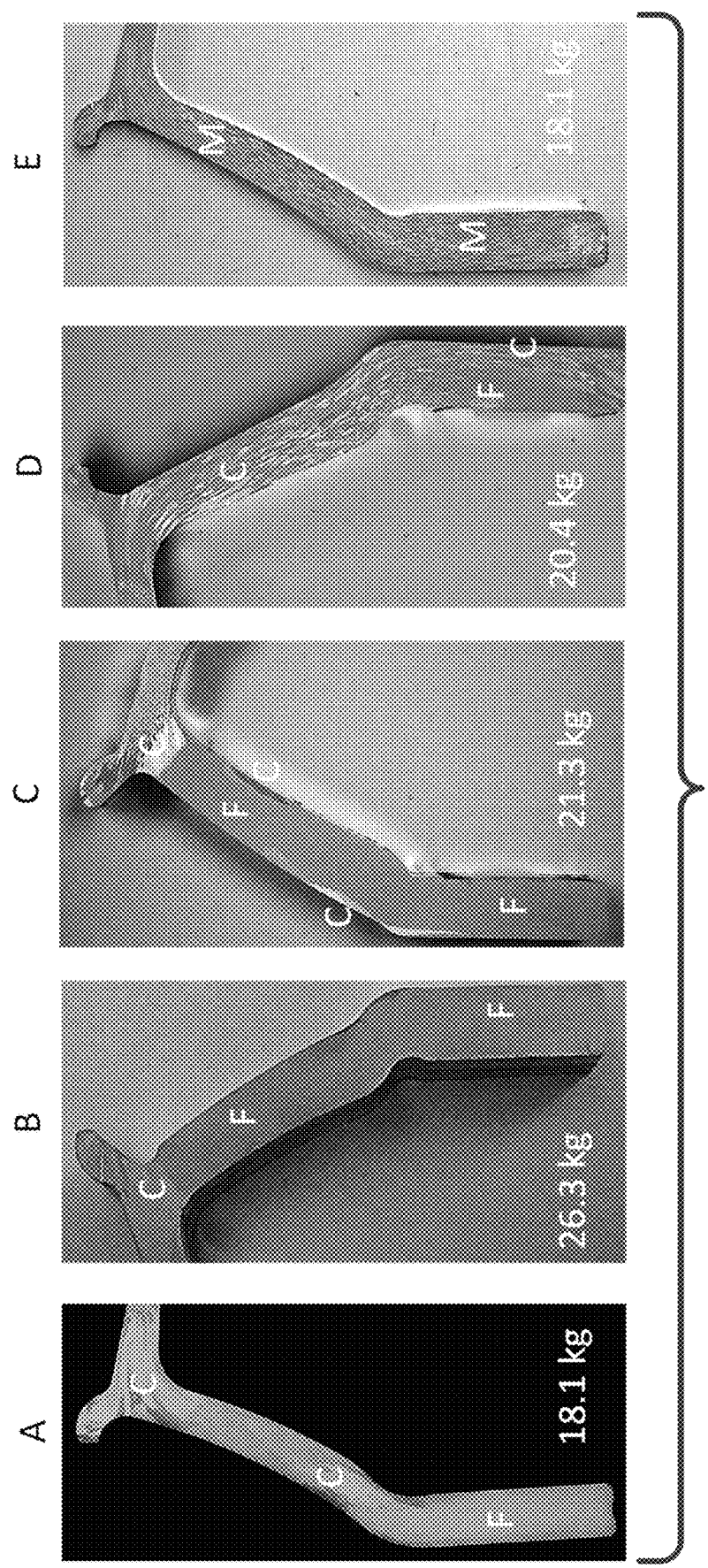
FIG. 4 shows grain structures for various test wheels after etching.

FIG. 4 shows grain structures for each test wheel after etching, where F=fine grains (those less than 0.4 mm), M=medium grains (those between 0.4 mm and 4 mm), and C=coarse grains (those greater than 4 mm). Etching was performed by (1) uniform grinding with 120 grit SiC and (2) 5 minutes in solution of 300 mL $H_2O$, 75 g $FeCl_3$, 450 mL $HNO_3$, and 150 mL HCl at room temperature. FIG. 4 shows that Test Wheel E is the only Test Wheel having medium grain size structure. In addition, Test Wheel E shows medium grain size structure throughout the disc portion of the wheel.

Figure 5:
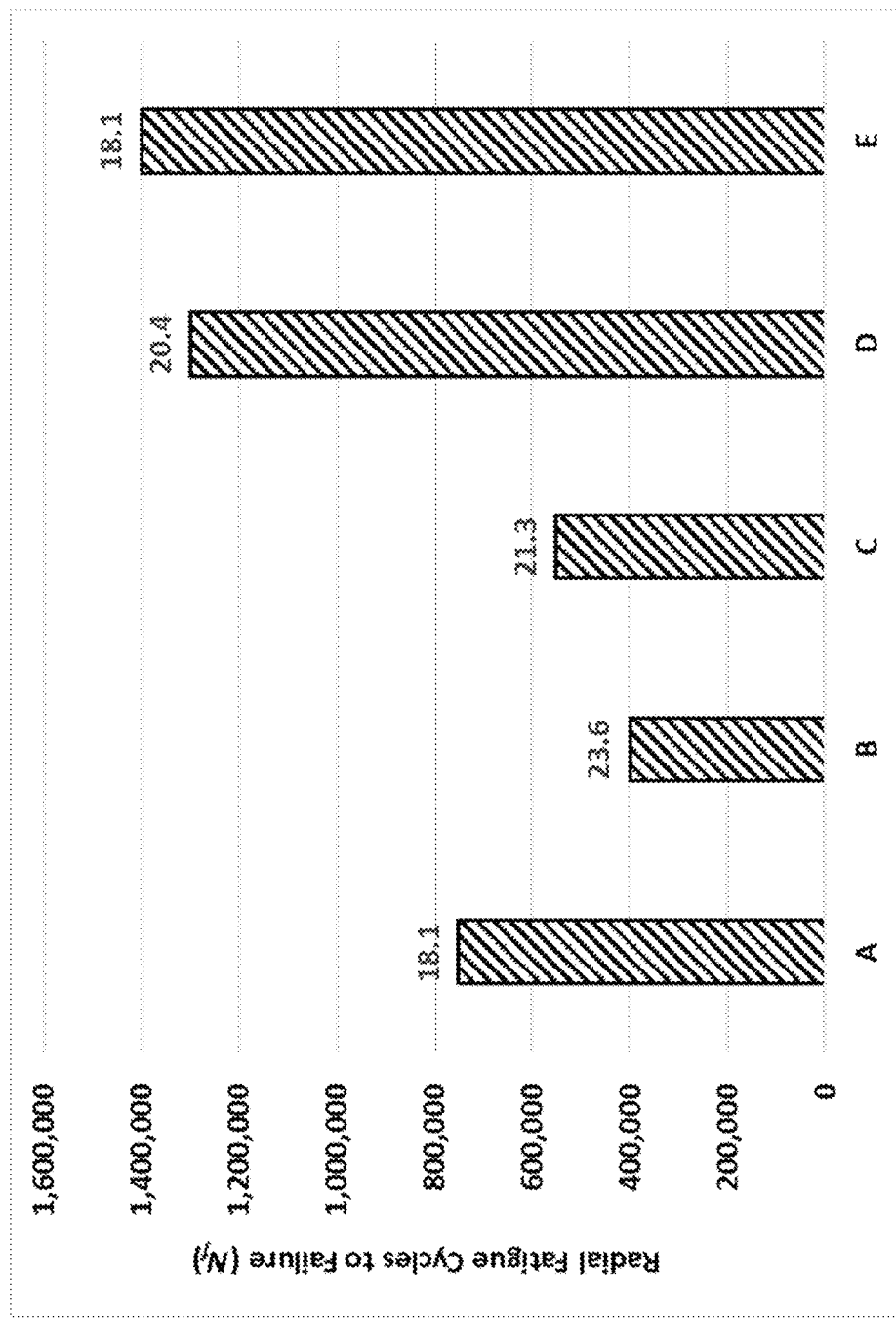
FIG. 5 shows fatigue performance of each of the test wheels shown in FIG. 4.

FIG. 5 shows fatigue performance of each of the test wheels listed in Table 3, where the fatigue performance is an average of at least two wheels. Wheel weights (in kg) are listed above each bar graph. Fatigue performance was obtained using Accuride CE-006 (which follows SAE J267). Test wheel E has the best fatigue performance of the five test wheels, and significantly better performance than test wheel A that is the same wheel weight.

Figure 6:
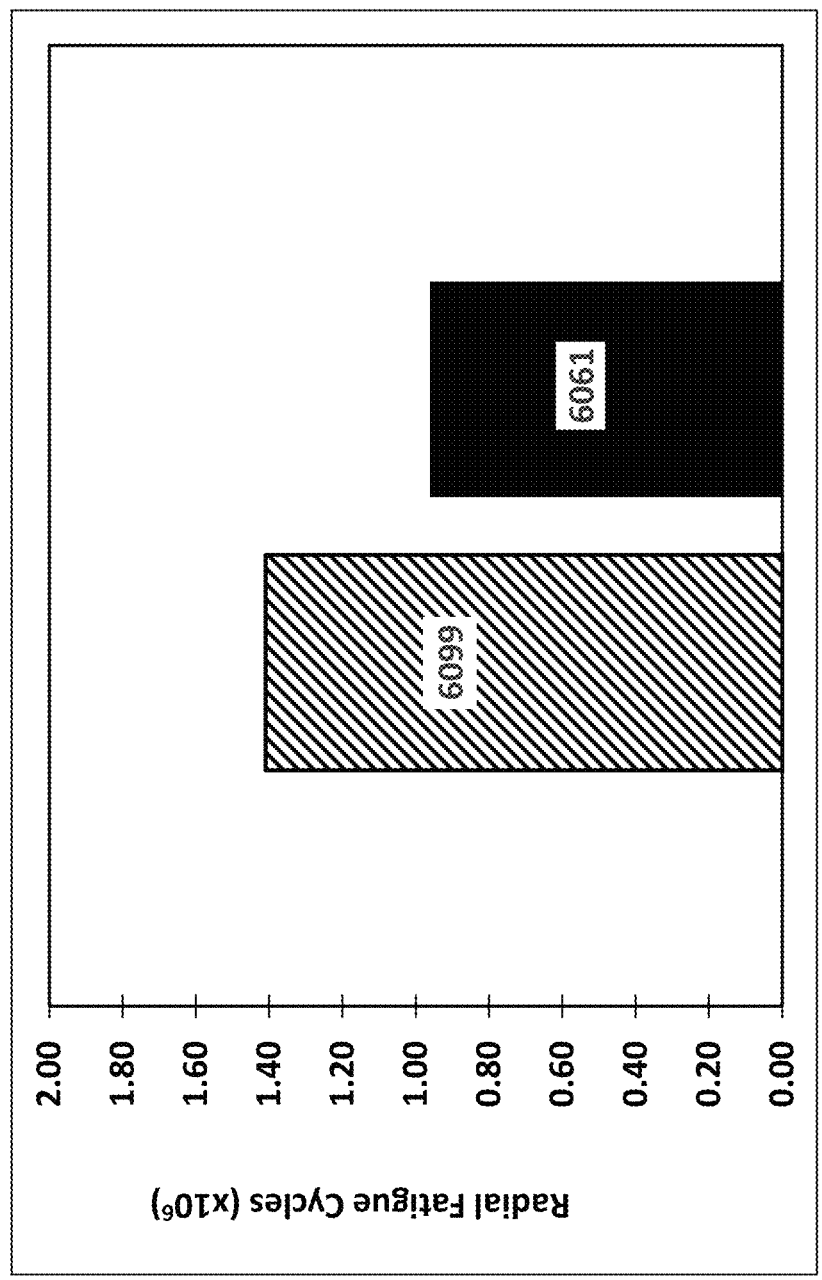
FIG. 6 shows fatigue performance for test wheel E shown in FIG. 4 for two different alloys.

FIG. 6 shows fatigue performance for test wheel E but manufactured with two different alloys (AA6061 and AA6099). These wheels were forged at similar temperatures and both exhibited medium recrystallized grain sizes of less than 4 mm. Fatigue performance was obtained using Accuride CE-006 (which follows SAE J267). The values shown in FIG. 6 are averages for 12 or more wheels. Improved performance of wheel E with AA6099 over wheel E with AA6061 can be attributed to, without being bound by any particular theory, high strength from Cu, Si, and Mg; better grain structure control with higher Mn; and/or improved resistance to fatigue crack propagation with higher Mg.

Figure 7:
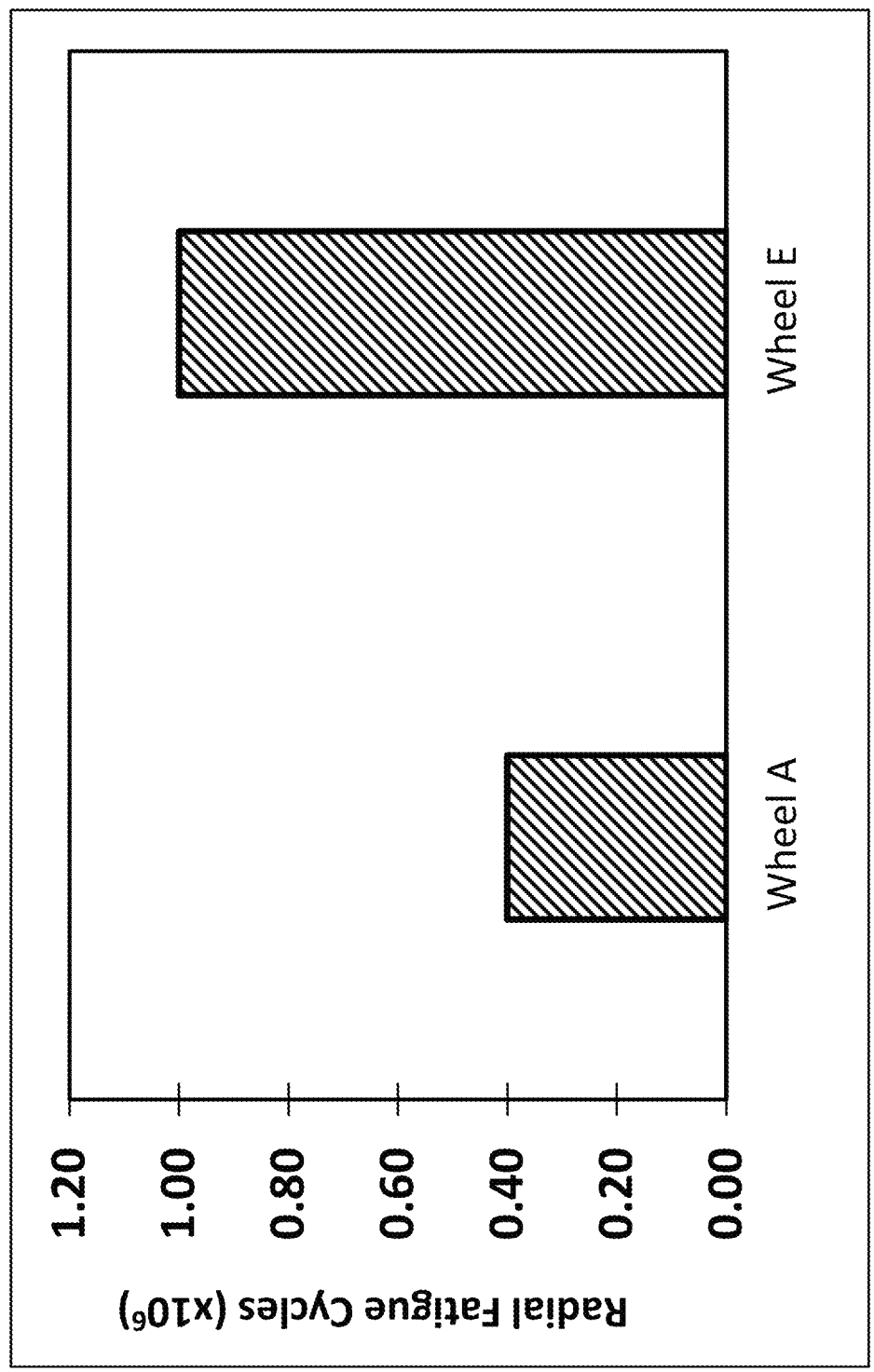
FIG. 7 shows fatigue performance for two test wheels shown in FIG. 4 when subjected to ASTM B368 followed by a radial wheel fatigue test.

FIG. 7 shows fatigue performance, as it specifically relates to corrosion behavior, for test wheel E and test wheel A when subjected to ASTM B368 (a 12 hr copper acetic acid salt spray (CASS) test) followed by a radial wheel fatigue test per Accuride CE-006. Comparing the results of test wheel A in FIG. 5 with the results shown in FIG. 7, without being bound by any particular theory, it appears that the failure mode of test wheel A was intensified when the wheel was exposed to CASS-fatigue. Again without being bound by any particular theory, it appears that poor grain structure control influenced wheel fatigue performance for both corroded and non-corroded wheels.

C. Experimental Example of a Closed Die Forging Process for AA6061 and AA6099

An experimental example evaluated required forces needed to form a wheel profile during the forging operation. In particular, a wheel profile was formed using an alloy known as AA6061 and an alloy known as AA6099. The alloy AA6061 included 0.4%-0.8% silicon, 0.15%-0.4% copper, 0.15% manganese, 0.8%-1.2% magnesium, 0.04%-0.35% chromium, 0.7% iron, 0.25% zinc, 0.15% titanium, and the balance aluminum, by weight percent. The alloy AA6099 included 0.8%-1.2% silicon, 0.1%-0.7% copper, 0.1%-0.4% manganese, 0.7%-1.2% magnesium, 0.04%-0.35% chromium, 0.7% iron, 0.25% zinc, 0.1% titanium, and the balance aluminum, by weight percent.

Figure 8:
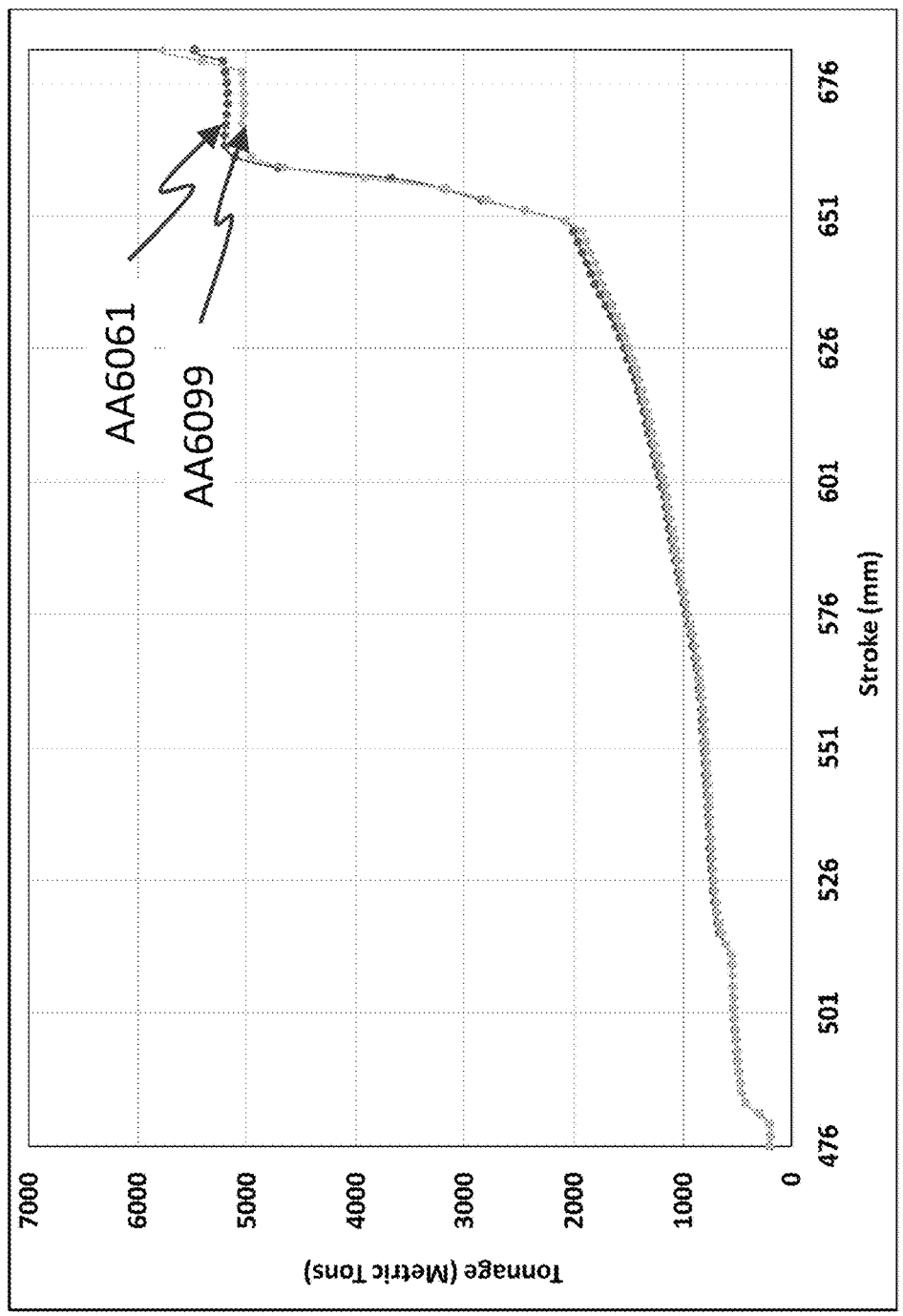
FIG. 8 shows a tonnage-stroke plot for two forgings comprised of different alloys.
Figure 9:
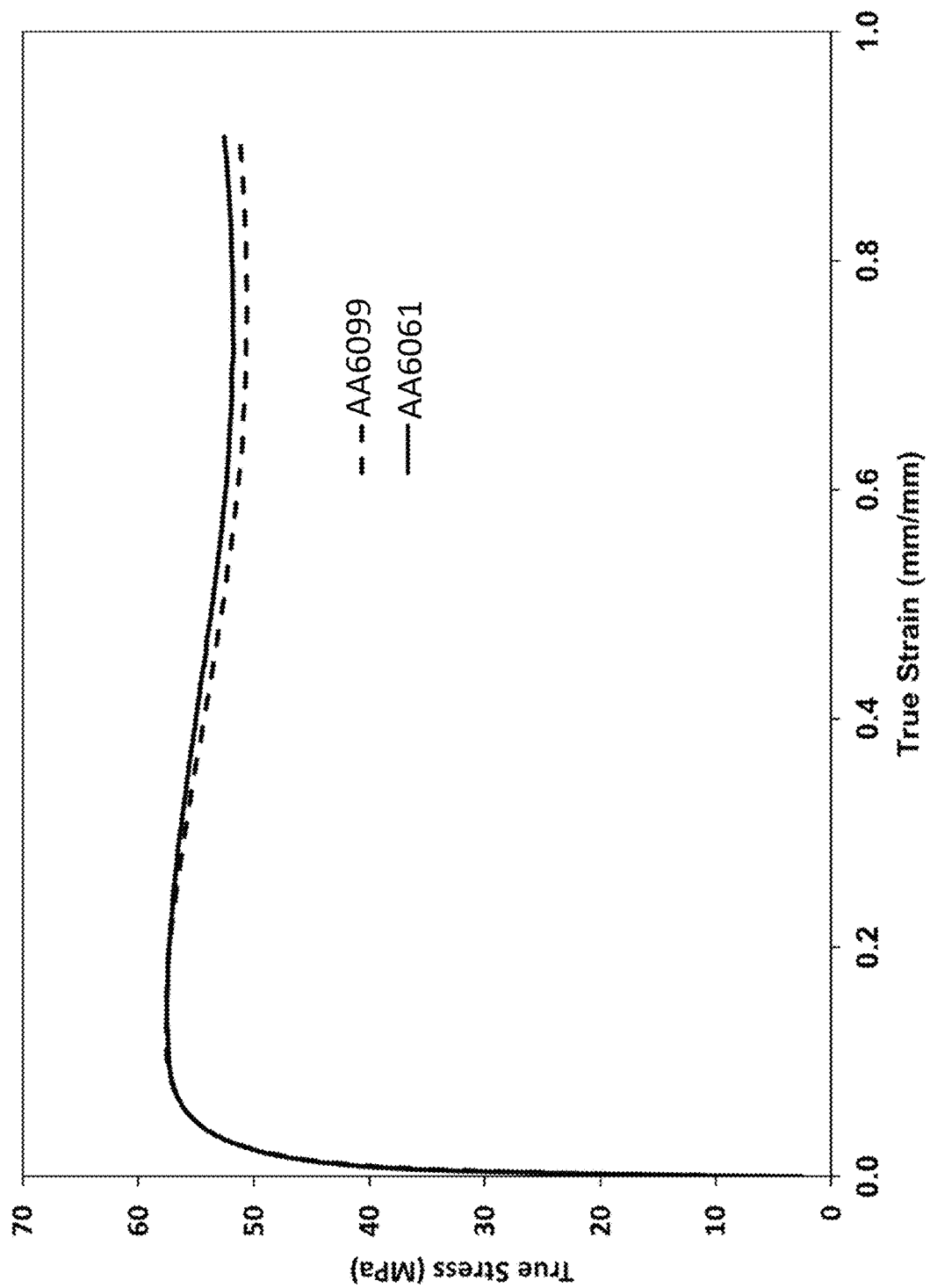
FIG. 9 shows a flow stress curve plot for the alloys in FIG. 8.

FIG. 8 shows a tonnage—stroke plot depicting the required forces needed to form the wheel part during this step in the operation. These data were obtained from the forging press during forming of the part, and show that the forces required to form the forged part are not significantly different when comparing AA6099 and AA6061, thereby showing that the formability is similar for the two alloys. This is further supported by the flow stress curves as shown in FIG. 9, which can be used to characterize the formability of a specific material. Whereas the tonnage curve includes other variables such as die temperature, forging lubricant and die geometry, flow stress data typically do not include these variables and the flow stress data were obtained by taking small compression samples from cast billet stock, heating them to the forming temperature and testing them on a laboratory scale press. These data further support the conclusion that the formability and flow stress for alloys AA6099 and AA6061 are comparable under similar hot deformation parameters.

D. Experimental Grain Structure Analysis for Different Levels of Cr and Mn

Three different alloy compositions were tested with varying levels of Cr and Mn. It will be appreciated that other components' weight percentages are slightly different because of normal production variance. The three compositions, having low Cr and Mn, medium Cr and Mn, and high Cr and Mn, relatively, are provided in Table 4 below. The Medium alloy has the composition of AA6099.

TABLE 4

Compositions of "low Cr and Mn", "medium Cr and Mn", and "high Cr and Mn" alloys tested.

| Alloy | Si | Fe | Cu | Mn | Mg | Cr | Zn | Ti |
|---|---|---|---|---|---|---|---|---|
| Low | 0.9 | 0.26 | 0.43 | 0.07 | 0.98 | 0.05 | 0.01 | 0.05 |
| Medium | 0.95 | 0.26 | 0.45 | 0.17 | 1.02 | 0.18 | 0.02 | 0.03 |
| High | 0.87 | 0.25 | 0.43 | 0.32 | 0.98 | 0.20 | 0.01 | 0.03 |

Each of the low, medium, and high alloys were forged at five different forging temperatures between 371° C. and 482° C. on conventional closed die forging presses. Specifically, the alloys were forged at 371° C., 399° C., 427° C., 454° C., and at 482° C. Trial data suggests that flow stress and press tonnage increases as Cr and Mn concentrations increase. Spin, heat treat, and machining processes were the same for each of the low, medium, and high alloys. The following analyses were performed: three radial fatigue tests on wheels for each alloy/temperature combination; macrostructure; tensile properties; and microstructure at disc mounting face, disc slope and rim drop center.

Table 5 below provides various characteristic data of the billets for each alloy.

TABLE 5

Billet characteristic data for the alloys in Table 4.

| | | | | Al—Fe—Si | | | $Mg_2Si$ | | Surface | |
| | Grain size | | | Size | Vol. | | Size | Vol. | ISZ | Shell |
| | | | | (μm) | Fract. | | (μm) | Fract. | depth | Zone |
| Alloy | (μm) | Porosity | Inclusions | L | W | (%) | L | W | (%) | (μm) | (μm) |
|---|---|---|---|---|---|---|---|---|---|---|---|
| Low | 52 | <1% | 100 mm Al—Fe—Si | 3.0 | 1.7 | 1.5 | 3.1 | 1.9 | 0.3 | 122 | 381 |
| Med | 54 | <1% | None | 3.2 | 1.7 | 1.4 | 4.0 | 2.3 | 0.7 | 208 | 353 |
| High | 54 | <1% | (1) 75 × 25 μm | 3.4 | 1.9 | 2.2 | 2.3 | 1.3 | 0.4 | 108 | 321 |

TABLE 6

Chemical composition of the elements comprising the Al—Fe—Si $2^{nd}$ phase constituent particles from Table 5.

| | at. % | | | | | | |
| | Al | Fe | Cu | Si | Cr | Mn | Fe + Cr + Mn |
|---|---|---|---|---|---|---|---|
| Low | 71.4 | 13.8 | 0.9 | 12.6 | 0.5 | 0.7 | 15.1 |
| Medium | 79.4 | 9.4 | 1.2 | 6.2 | 1.2 | 2.6 | 13.3 |
| High | 76.9 | 4.9 | 0.5 | 9.6 | 2.5 | 5.6 | 13.0 |

As the manganese and chrome increase in the alloy, the fraction of these elements increases inhomogenously in the Al—Fe—Si, $2^{nd}$ phase constituent particles, and more of these particles form (higher volume fraction in Table 5). It is theorized that this causes a reduction in available Si for the formation of the strengthening phases that are comprised of Mg—Si and Al—Mg—Si—Cu particles. Further, it is theorized that when the amounts of manganese and chromium in the alloy are low, the volume fraction of Al—Fe—Si is lower, but the concentration of Si in the phase is higher. It is theorized that this will limit the free silicon needed to form the strengthening precipitates.

Dispersoids of each billet were also measured. The dispersoids were measured in the center of grains. Table 7 shows the experimental results. Spacing is calculated as 1/distribution. The "high" billet dispersoid analyzed was disc-shaped, with a length of 289 nm and a width of 138 nm.

TABLE 7

Dispersoids data for the billets in Table 5.

| Billet | Dispersoid size (nm) | Distribution (#/μm²) | Spacing (μm) |
|---|---|---|---|
| Low | 248 | 0.06 | 16.7 |
| Medium | 226 | 0.29 | 3.4 |
| High | 214 | 0.50 | 2.0 |

Figure 10C:
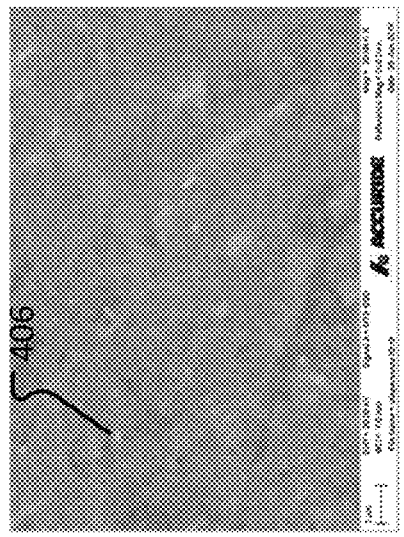
FIGS. 10A, 10B, and 10C show scanning electron micrographs of surfaces of three different billets.
Figure 10B:
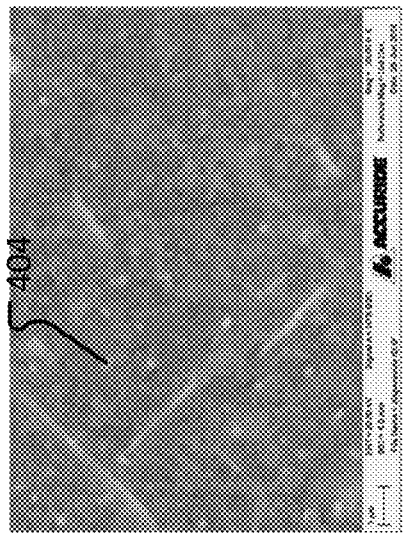
Figure 10A:
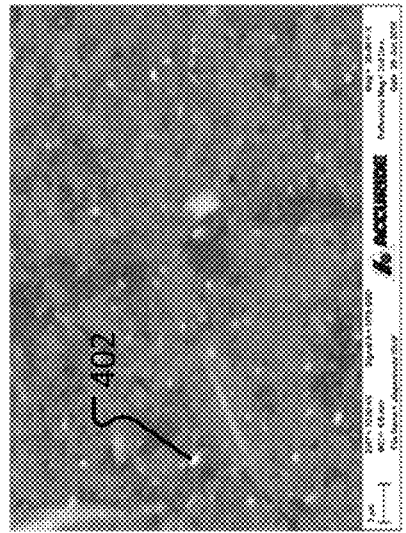

FIGS. 10A, 10B, and 10C show micrographs of surfaces of the low, medium, and high billets. FIGS. 10A, 10B, and 10C were obtained using a scanning electron microscope (SEM) set at: extra high tension (EHT) voltage of 20.0 kV, working distance (WD) of 5.0 mm, magnification 20,000×. Dispersoids 402, 404, and 406 are labeled in FIGS. 10A, 10B, and 10C. Not all dispersoids are labeled. It can be seen from FIGS. 10A, 10B, and 10C that as the Cr and Mn increases, the quantity of dispersoids also increases.

Figure 11C:
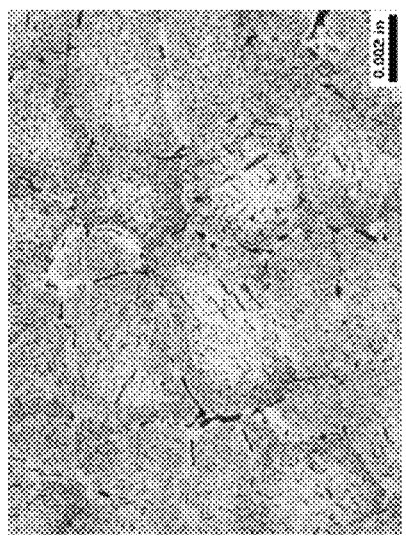
FIGS. 11A, 11B, and 11C show optical micrographs of etched surfaces of the billets shown in FIGS. 10A-10C.
Figure 11B:
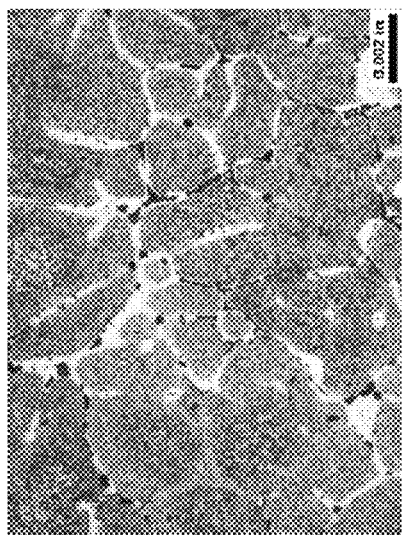
Figure 11A:
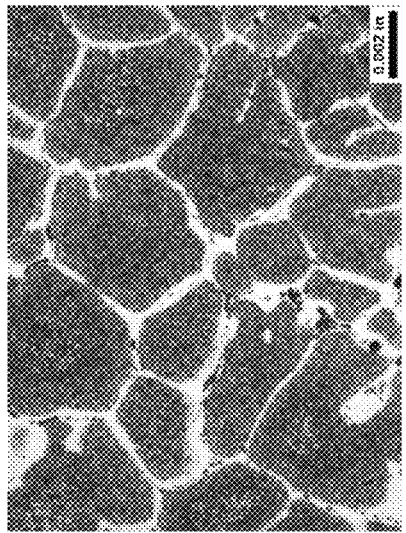

FIGS. 11A, 11B, and 11C show optical micrographs of etched surfaces of the low, medium, and high billets. FIGS. 11A, 11B, and 11C were obtained using the following method. First, a sample was metallographically polished with final colloidal silica (0.04 μm) polish. Then a swab etch with Keller's reagent (2 ml HF, 3 ml HCL, 5 ml HNO₃, 190 ml H₂O) was performed for approximately 1 minute. Then optical microscopy and grain size measurements were performed by ASTM E112 line method in the horizontal (length) and vertical (width) directions.

During etching, the dispersoids disappear and create pitting. It can be seen from FIGS. 11A, 11B, and 11C that the amount of pitting increases as the Cr and Mn increases.

Figure 12:
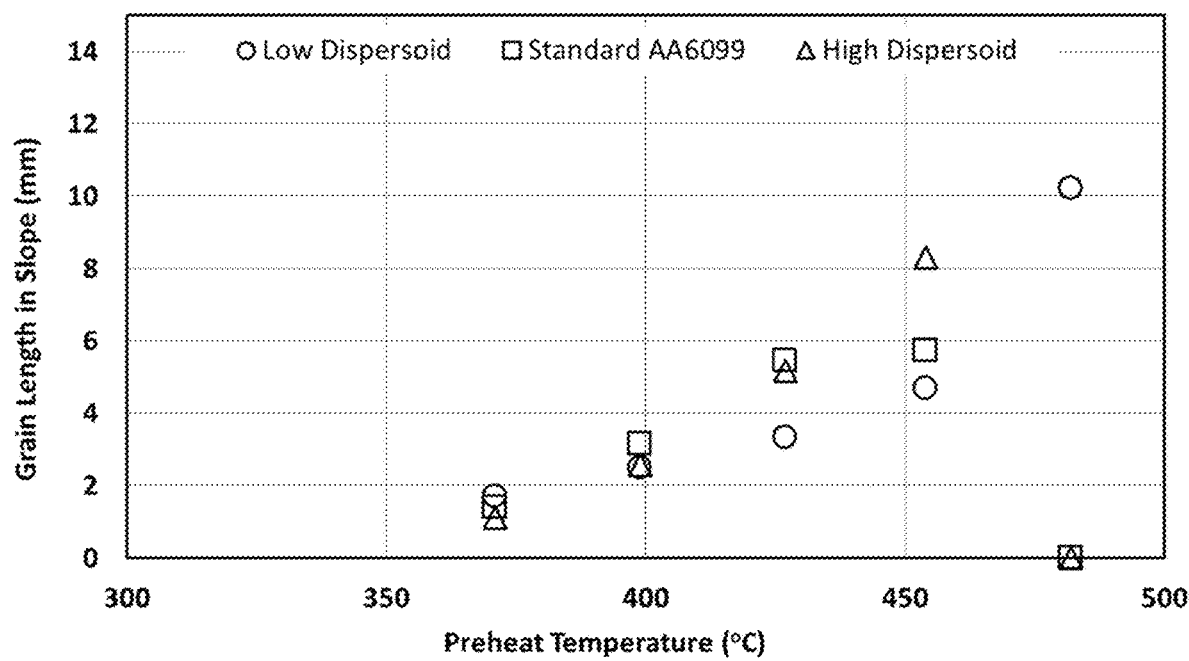
FIG. 12 shows grain length for the three alloys in FIGS. 10A-10C when forged at different temperatures.

Grain size was determined for each of the three alloys at the five different forging temperatures, shown in the graph in FIG. 12. Generally, grain length increased with higher preheat temperatures for each of the three alloys. Acceptable radial fatigue at the hand hold and the edge of nut (EON) positions was observed for alloys having average grain lengths greater than 0 mm and no greater than 4 mm.

Figure 13:
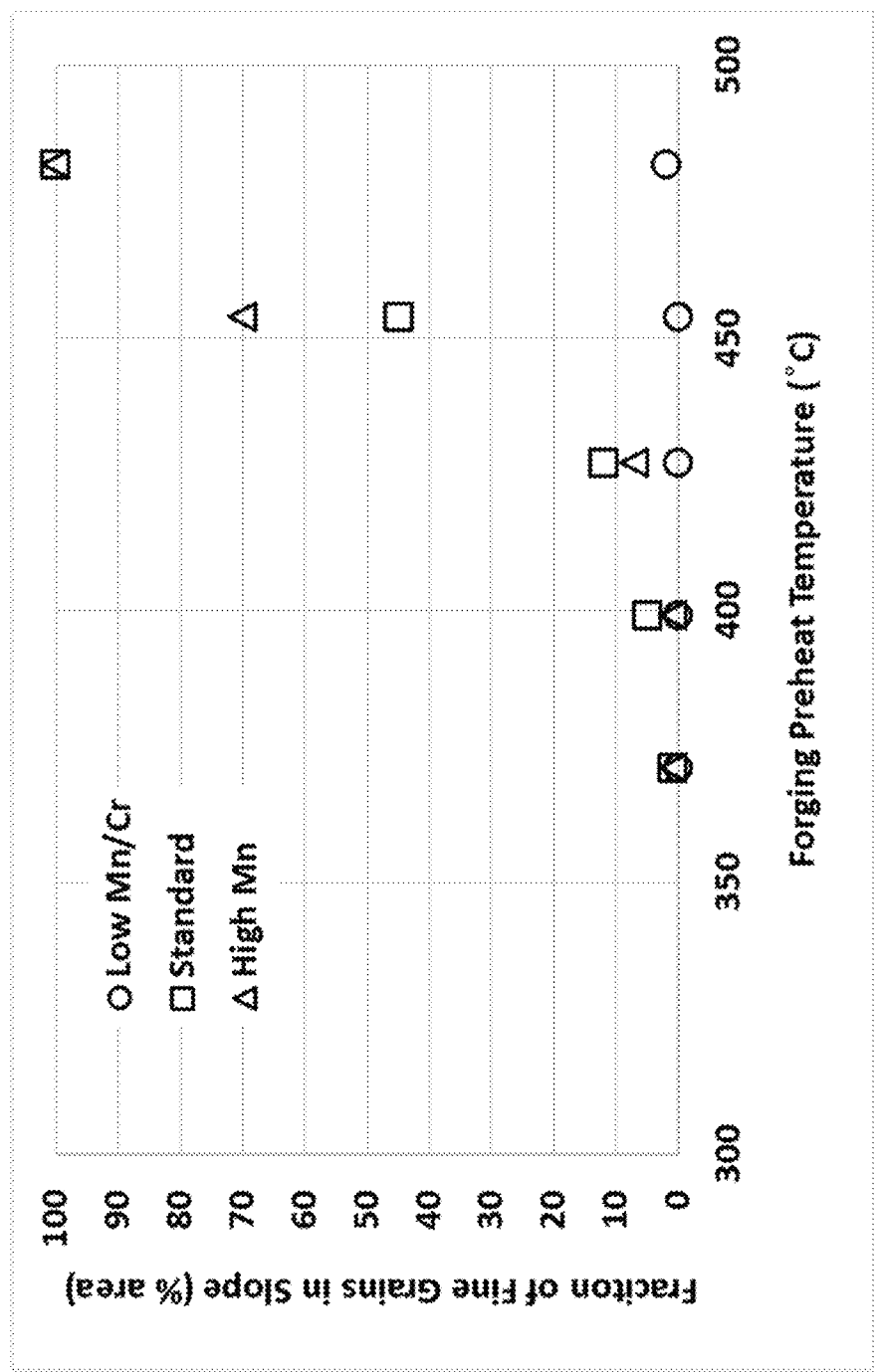
FIG. 13 shows a fraction of fine grains in the slope of wheels made using the three alloys in FIGS. 10A-10C forged at different temperatures.
Figure 14:
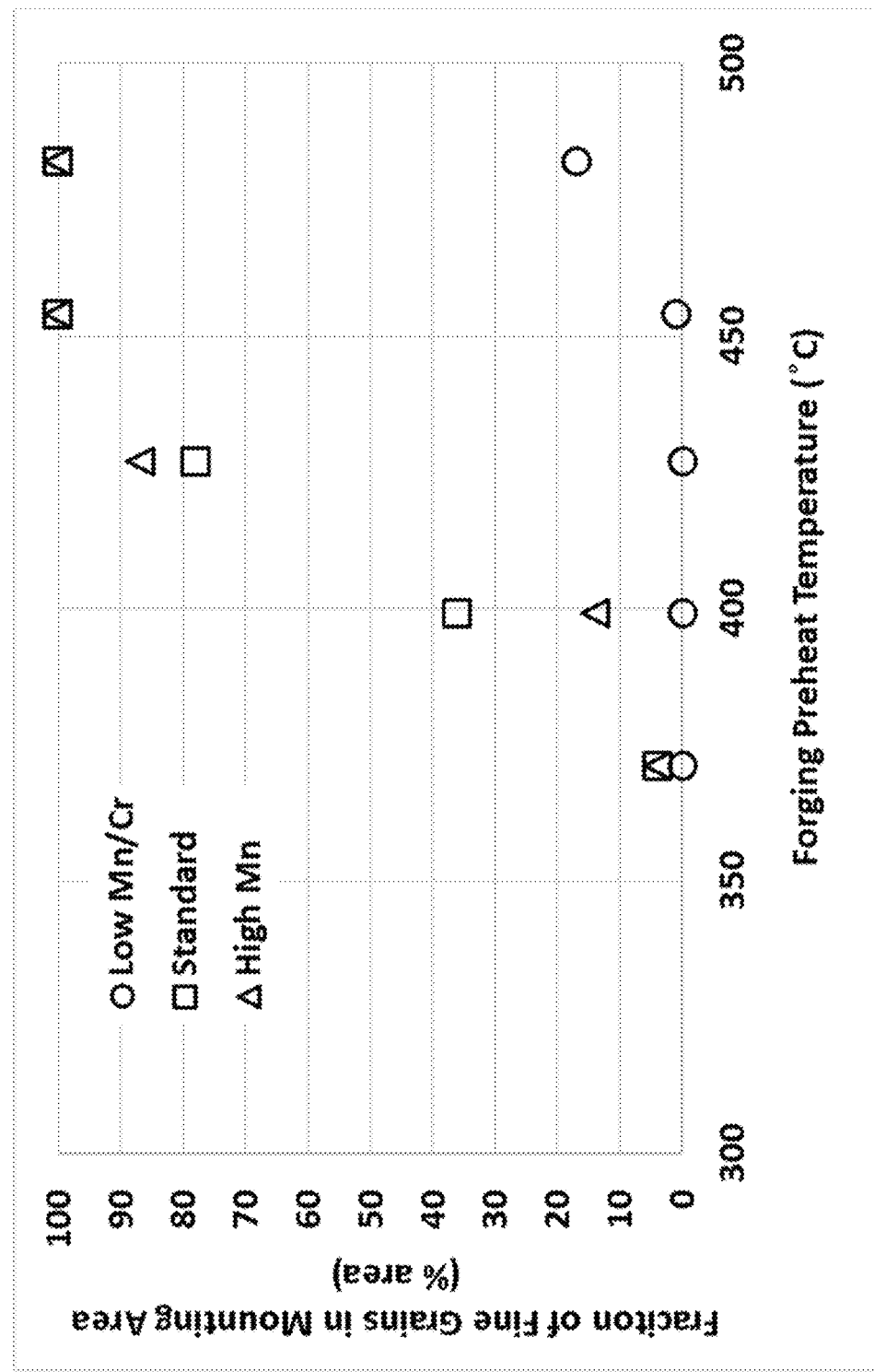
FIG. 14 shows a fraction of fine grains in the mounting area of wheels made using the three alloys in FIGS. 10A-10C forged at different temperatures.
Figure 15:
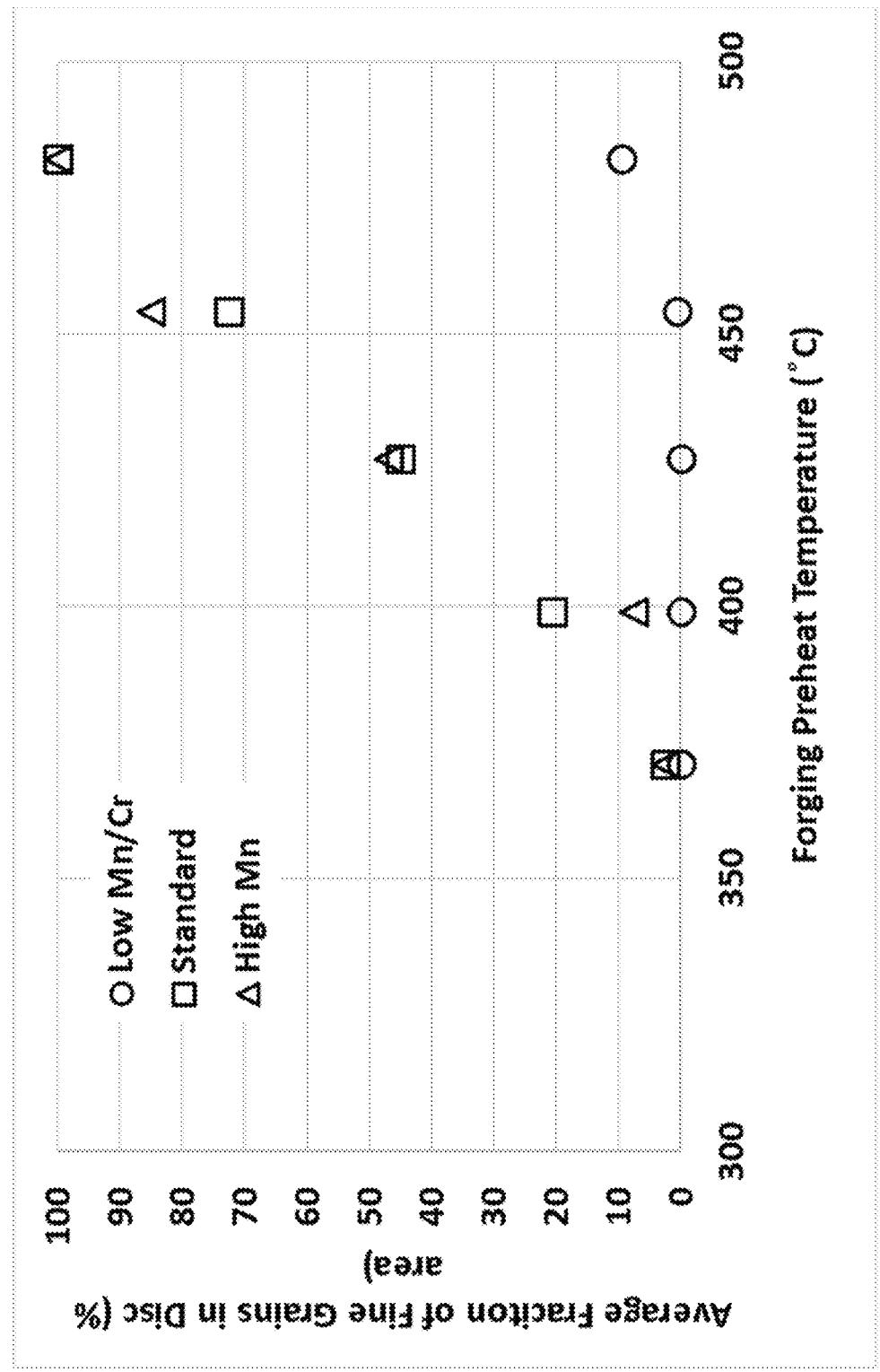
FIG. 15 shows a fraction of fine grains in the disc area of wheels made using the three alloys in FIGS. 10A-10C forged at different temperatures.
Figure 16:
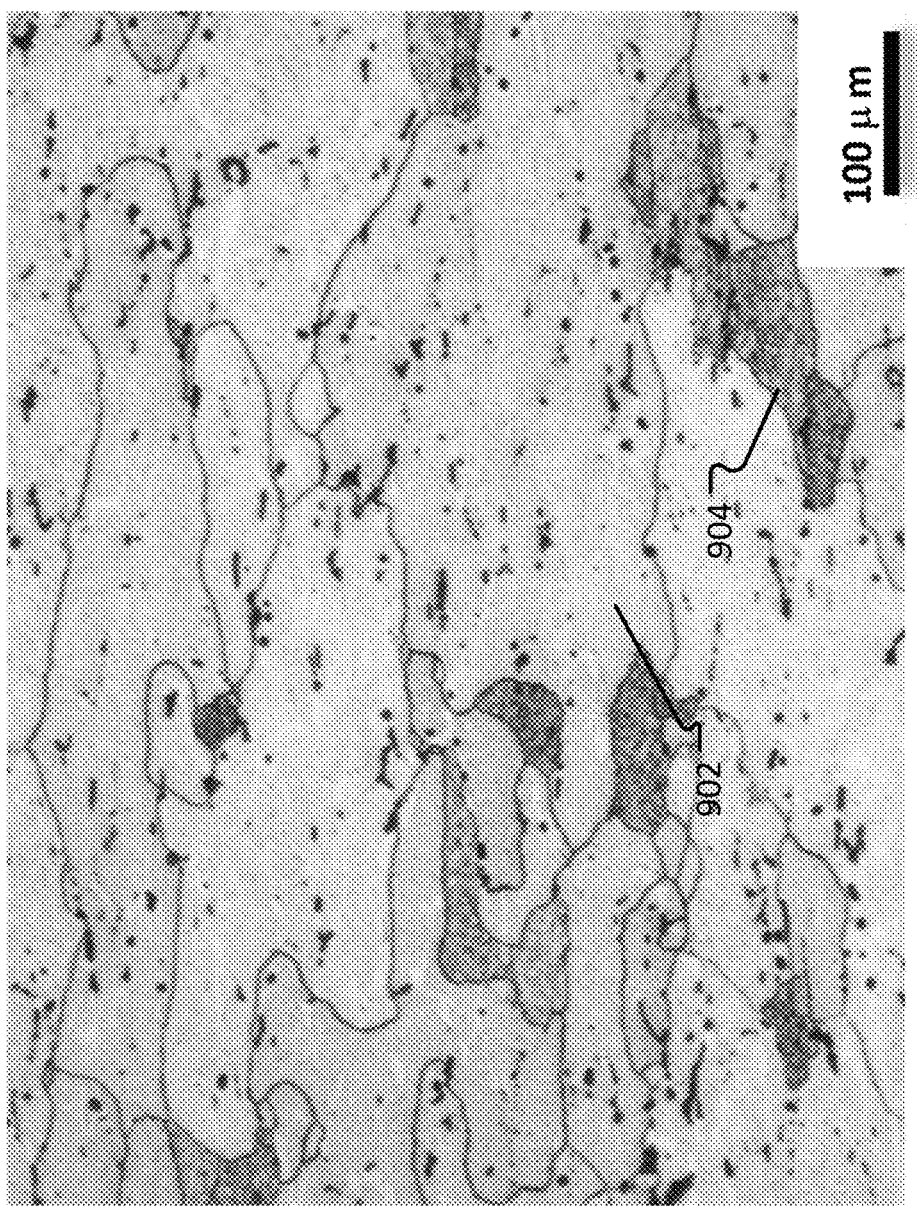
FIG. 16 is a micrograph of one of the alloys shown in FIGS. 10A-10C.

A percent of fine grains for each of the three alloys was also determined at three wheel locations. FIG. 13 shows a fraction of fine grains in the slope of the wheel. FIG. 14 shows a fraction of fine grains in the mounting area of the wheel. Without being bound by a particular theory, it appears that having a high percentage of fine grains in the mounting area resulted in worse fatigue performance. For instance, acceptable radial fatigue in the mounting area was observed when the fraction of fine grains in the mounting area was no greater than 50%. FIG. 15 shows a fraction of fine grains in the disc portion of the wheel. FIG. 16 is a micrograph of one of the alloys, where grain 902 is an example of medium grain and grain 904 is an example of fine grain.

Figure 17:
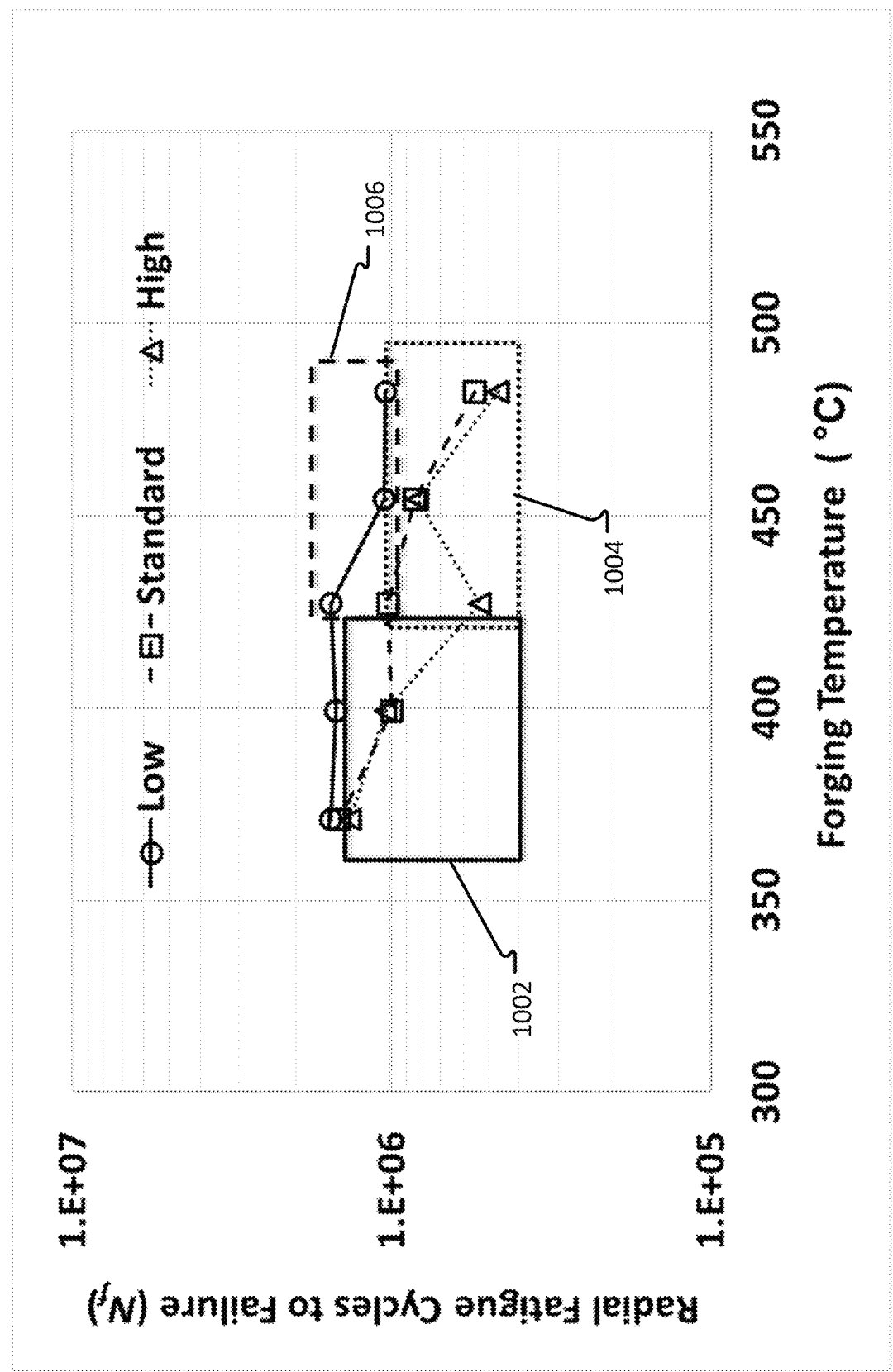
FIG. 17 shows the number cycles to failure for wheels made using the three alloys in FIGS. 10A-10C forged at different temperatures.

Radial fatigue cycles-to-failure experiments were also performed on wheels for the three alloys forged at five different temperatures. FIG. 17 is a logarithmic plot showing the number of cycles-to-failure for wheels made with the three alloy compositions forged at five different temperatures.

Area 1002 shows forging temperatures and composition ranges where closed side flange cracks were observed, possibly because of coarse grains. Area 1004 shows forging temperatures and composition ranges where mounting face cracks were observed, possibly because the grains were too fine. Area 1006 shows forging temperatures and composition ranges where hand hole cracks were observed, possibly because the grains were too coarse.

As an example, closed side flange cracks were observed in the "medium" alloy wheel forged at 371° C. In the "low" alloy wheel forged at 371° C., medium recrystallized grains were observed and there were no closed side flange cracks after the same number of cycles that caused the "medium" alloy at 371° C. to crack. Edge of nut cracks were observed in the "high" alloy forged at 427° C. Hand hole cracks were observed in both the "low" alloy forged at 454° C. and the "medium" alloy forged at 371° C. Based on these experimental data, without being bound by a particular theory, it appears that forging the "low" alloy at temperatures of at least 371° C. but less than 427° C. provides the best fatigue performance.

E. Experimental Grain Structure Analysis for Different Levels of Fe and Mn

Experimental example composition alloys were manufactured and tested to analyze different levels of Fe and Mn and to evaluate resulting grain structures. More specifically, five different test compositions were manufactured and forged at a temperature of 427° C. Grain size analysis was performed on each test composition, which included determining an average grain length and an average grain width, both in millimeters (mm). The five test compositions and the determined average grain sizes are provided in Table 8, below.

TABLE 8

Grain size analysis for different amounts of Fe + Mn.

| | Composition (wt. %) | | | | | | | | | Grain size (mm) | |
|---|---|---|---|---|---|---|---|---|---|---|---|
| Test | Si | Fe | Cu | Mn | Mg | Cr | Zn | Ti | Fe + Mn | Length | Width |
| 1 | 0.90 | 0.26 | 0.43 | 0.07 | 0.98 | 0.05 | 0.01 | 0.05 | 0.33 | 3.31 | 0.31 |
| 2 | 0.89 | 0.19 | 0.43 | 0.06 | 1.02 | 0.07 | 0.02 | 0.02 | 0.25 | 4.24 | 0.40 |
| 3 | 0.88 | 0.18 | 0.41 | 0.06 | 1.02 | 0.06 | 0.02 | 0.02 | 0.24 | 4.64 | 0.42 |
| 4 | 0.88 | 0.16 | 0.36 | 0.06 | 0.96 | 0.07 | 0.01 | 0.03 | 0.22 | 5.10 | 0.42 |
| 5 | 0.86 | 0.16 | 0.36 | 0.06 | 0.96 | 0.07 | 0.01 | 0.03 | 0.22 | 4.71 | 0.39 |

FIG. 18 is a plot showing grain length (mm) as a function of Fe+Mn content in weight percentage (wt. %). Without being bound by a particular theory, it appears that in order to obtain alloys having average grain lengths no greater than 4.0 mm, Fe+Mn wt % should be no less than 0.28 wt %. Experimental results also indicate that when Fe+Mn content is more than 0.45 wt %, undesirable fine grains are stabilized.

F. Experimental Grain Structure Analysis for Higher Temperatures

Experimental example wheels were manufactured and tested for grain size and fatigue performance. Wheels having the composition in Table 9 were forged at 399° C., 427° C., and 454° C. A total amount of Fe and Mn in the alloy was 0.28 wt. %.

TABLE 9

Example alloy tested at various forging temperatures.

| | Si | Fe | Cu | Mn | Mg | Cr | Zn | Ti |
|---|---|---|---|---|---|---|---|---|
| Component (wt. %) | 0.91 | 0.18 | 0.39 | 0.10 | 1.02 | 0.06 | 0.01 | 0.02 |

In the experiments, grain size analysis was performed on the disc slope only. The grain size is the average grain length and average grain width. Fatigue tests were also performed on each alloy, where fatigue life is an estimate based on Accuride Test Standard CE-006 (which follows SAE J267). The grain size and fatigue life data for each wheel alloy is shown in Table 10, below.

TABLE 10

Experimental radial fatigue life results for wheels manufactured with the test alloy in Table 9.

| Forging Temperature (° C.) | Disc slope grain size (mm) | | | Radial Fatigue Life (cycles) |
|---|---|---|---|---|
| | Length | Width | Aspect ratio | |
| 454 | 5.97 | 0.38 | 16 | 1,283,333 |
| 427 | 5.46 | 0.30 | 18 | 1,483,333 |
| 399 | 4.45 | 0.29 | 15 | 1,766,666 |

As shown in Table 10, wheels having average grain lengths in the disc slope greater than 4.00 mm but less than 6.00 mm display improved radial fatigue life. Thinner grains appear to provide good fatigue performance for wheels forged at temperatures at or above 427° C.

For the recitation of numeric ranges herein, each intervening number therebetween with the same degree of precision is contemplated. For example, for the range of 6-9, the numbers 7 and 8 are contemplated in addition to 6 and 9, and for the range 6.0-7.0, the numbers 6.0, 6.1, 6.2, 6.3, 6.4, 6.5, 6.6, 6.7, 6.8, 6.9, and 7.0 are contemplated. For another example, when a pressure range is described as being between ambient pressure and another pressure, a pressure that is ambient pressure is expressly contemplated.

It is understood that the foregoing detailed description and accompanying examples are merely illustrative and are not to be taken as limitations upon the scope of the disclosure. Various changes and modifications to the disclosed embodiments will be apparent to those skilled in the art. Such changes and modifications, including without limitation those relating to the chemical structures, substituents, derivatives, intermediates, syntheses, compositions, formulations, or methods of use, may be made without departing from the spirit and scope of the disclosure.

What is claimed is:

1. An aluminum wheel having a rim and a disc, the aluminum wheel formed of an aluminum alloy comprising, by weight:
   0.80% to 1.20% silicon;
   0.08% to 0.37% iron;
   0.35% to 0.55% copper;
   0.08% to 0.37% manganese;
   0.70% to 1.20% magnesium;
   0.05% to 0.11% chromium;
   no more than 0.20% zinc; and
   no more than 0.05% titanium,
   and the balance of weight percent comprising aluminum and incidental elements and impurities,
      wherein the aluminum alloy has a total amount of iron and manganese no less than 0.28% by weight and no greater than 0.45% by weight;
   wherein the disc includes aluminum alloy grains that have an average grain length that is no less than 0.4 millimeters (mm) and no greater than 6 mm.

2. The aluminum wheel according to claim 1, wherein the total amount of iron and manganese is no less than 0.30% by weight and no greater than 0.37% by weight.

3. The aluminum wheel according to claim 1, wherein the aluminum alloy grains have an average grain width that is no greater than 0.40 mm.

4. The aluminum wheel according to claim 1, wherein the disc has a disc area, the disc area including less than 50% by area fraction of fine grains.

5. The aluminum wheel according to claim 1, wherein a total amount of iron and manganese is no less than 0.28% by weight.

6. The aluminum wheel according to claim 1, wherein the total amount of iron and manganese is no greater than 0.45% by weight.

7. The aluminum wheel according to claim 1, wherein the total amount of iron and manganese is no less than 0.30% by weight and no greater than 0.37% by weight.

8. The aluminum wheel according to claim 1, wherein the disc further comprises dispersoids, a dispersoid distribution in the aluminum alloy being no greater than 0.2 per $\mu m^2$.

9. An aluminum wheel having a rim and a disc, the aluminum wheel formed of an aluminum alloy comprising, by weight:
   0.80% to 1.20% silicon;
   0.08% to 0.37% iron;
   0.35% to 0.55% copper;
   0.08% to 0.37% manganese;
   0.70% to 1.20% magnesium;
   0.05% to 0.11% chromium;
   no more than 0.20% zinc; and
   no more than 0.05% titanium,
   and the balance of weight percent comprising aluminum and incidental elements and impurities,
      wherein the aluminum alloy comprises a plurality of aluminum alloy grains, the plurality of aluminum alloy grains having an average grain length that is no less than 0.4 mm and no greater than 6 millimeters (mm).

* * * * *